United States Patent [19]

Berner et al.

[11] 4,336,366
[45] Jun. 22, 1982

[54] THERMALLY POLYMERIZABLE MIXTURES AND PROCESSES FOR THE THERMALLY-INITIATED POLYMERIZATION OF CATIONICALLY POLYMERIZABLE COMPOUNDS

[75] Inventors: Godwin Berner, Rheinfelden; Rudolf Kirchmayr, Aesch, both of Switzerland

[73] Assignee: Ciba-Geigy Corporation, Ardsley, N.Y.

[21] Appl. No.: 236,465

[22] Filed: Feb. 20, 1981

[30] Foreign Application Priority Data

Feb. 29, 1980 [CH] Switzerland .......................... 1627/80

[51] Int. Cl.$^3$ .......................... C08F 2/50; C08K 5/06; C08K 5/11; C08G 65/10
[52] U.S. Cl. .................. 528/89; 204/159.11; 204/159.21; 204/159.23; 204/159.24; 526/192; 526/193; 526/195; 526/126; 528/91; 528/92; 528/93; 528/138; 528/141; 528/143; 528/144; 528/233; 528/280; 528/274; 528/285; 528/286; 526/90; 526/172
[58] Field of Search ............ 204/159.23, 159.11, 204/159.24, 159.21; 526/192, 193, 195, 126, 90, 172; 528/88, 89, 91, 92, 93, 138, 141, 143, 144, 233, 280, 285, 286, 274

[56] References Cited

U.S. PATENT DOCUMENTS

| | | |
|---|---|---|
| 3,236,784 | 2/1966 | Fischer . |
| 3,313,863 | 4/1967 | Schnell et al. .................. 526/206 |
| 3,378,533 | 4/1968 | Schnell et al. .................. 526/208 |
| 3,981,897 | 9/1976 | Crivello . |
| 4,020,233 | 4/1977 | Morgan .......................... 204/159.23 |
| 4,173,551 | 11/1979 | Crivello . |
| 4,251,650 | 2/1981 | Mietzsch et al. ................ 526/194 |

FOREIGN PATENT DOCUMENTS

| | | |
|---|---|---|
| 2632294 | 1/1978 | Fed. Rep. of Germany . |
| 51-19712 | 2/1976 | Japan . |
| 1491539 | 6/1980 | United Kingdom . |
| 2034317 | 6/1980 | United Kingdom .......... 204/159.11 |
| 2034318 | 6/1980 | United Kingdom .......... 204/159.11 |

OTHER PUBLICATIONS

Ledwith "Possibilities for Promoting Cationic . . . ", Oct. 1978 Polymer 78, vol. 19, pp. 1217-1219.
Braun et al., "Kinetik . . . Pinakolen" Die Makromol. Chemie 147 (1971) pp. 91-99.
F. A. M. Abdul-Rasoul et al., Polymer, 19, 1219 (1978).
F. M. Beringer et al., J. Am. Chem. Soc., 75, 2705 (1953).
F. M. Beringer et al., J. Am. Chem. Soc., 81, 342 (1959).

Primary Examiner—Wilbert J. Briggs, Sr.
Assistant Examiner—Arthur H. Koeckert
Attorney, Agent, or Firm—Luther A. R. Hall

[57] ABSTRACT

Cationically polymerizable compounds, for example cyclic ethers, can be thermally polymerised if an aromatic iodonium salt of the formula I

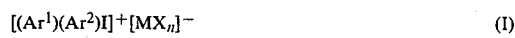

in which $Ar^1$, $Ar^2$, M, X and n are as defined in claim 1, is used as the catalyst and an agent which forms free radicals on heating and has the formula III or IV

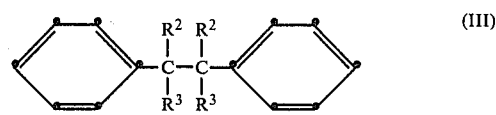

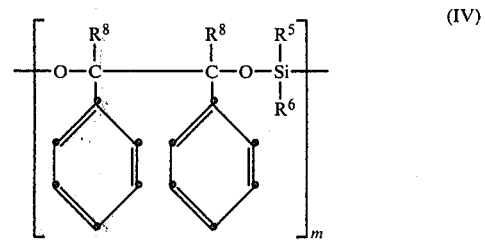

in which $R^2$, $R^3$, $R^5$, $R^6$, $R^8$ and m are as defined in claim 1, for example a benzpinacol silyl ether, is used as the co-catalyst. The process is of particular importance for heat-curing epoxide resins as a one-component system.

13 Claims, No Drawings

THERMALLY POLYMERIZABLE MIXTURES AND PROCESSES FOR THE THERMALLY-INITIATED POLYMERIZATION OF CATIONICALLY POLYMERIZABLE COMPOUNDS

The invention relates to thermally polymerisable mixtures of cationically polymerisable compounds and a specific catalyst combination and also to the corresponding process for the thermally-initiated polymerisation of cationically polymerisable compounds.

Cationically polymerisable compounds, which do not have an ethylenically unsaturated group, cannot be polymerised by simple heating. The addition of free radical initiators also has no effect. Only when catalysts are used which form a cationic initiator on exposure to heat is it possible to effect thermally-initiated polymerisation of such monomers. One example of this is the thermally-initiated polymerisation of trioxan in the presence of aromatic diazonium salts, which is described in U.S. Pat. No. 3,236,784. These diazonium salts have the disadvantage of an inadequate storage stability at room temperature. Aromatic sulfonium or iodonium salts of complex halides which are known to be able to initiate cationic polymerisation on irradiation with UV light, act as cationic initiators only at relatively high temperatures without irradiation with UV light. The polymerisation temperature can be lowered to a technologically interesting range only by the addition of copper-II salts as co-catalysts, in accordance with U.S. Pat. No. 4,173,551. Technical disadvantages of this process are, on the one hand, the blue-green colour of the copper salts, the inadequate solubility of these salts in many resins and their precursors or monomers, the autocatalytic effect of heavy metal salts in the light degradation of polymers, the impairment in the dielectric properties of resins which results from a content of conductive salts and the inadequate storage stability of these mixtures.

In Polymer, 1978, 1219-22, F. Abdul-Rasoul, A. Ledwith and Y. Yagci recently stated that the cationic, thermally-initiated polymerisation of tetrahydrofuran with ditolyliodonium hexafluorophosphate as the catalyst proceeds at an immeasurably slow rate at 70° C. However, if an agent which forms free radicals on heating is also added as the co-catalyst to this system, up to 17% conversion to the polymer takes place within 60 minutes. Azoisobutyronitrile, benzoyl peroxide, phenylazo-triphenylmethane and benzpinacol are mentioned as suitable free radical co-catalysts.

The polymerisation times required are too long and the conversion is too low for technical utilisation of this effect. It has now been found that cationically polymerisable compounds can be thermally polymerised in times which are of interest from the industrial standpoint if aromatic iodonium salts, in combination with specific agents which form free radicals on heating, are used as the catalyst. These specific agents which form free radicals are derivatives of dibenzyl, which do not possess any free OH groups and thus, compared with benzpinacol, decompose at lower temperatures, which manifests itself in a higher yield of free radicals, without the storage stability being reduced. In addition, these compounds are more readily soluble than benzpinacol in most polymerisable compounds. A further advantage is that compositions polymerised in this way yellow to a lesser extent on exposure to light than do the products polymerised using benzpinacol as the co-catalyst, and, in some cases, also possess a higher affinity for glass fibres.

The invention therefore relates to thermally polymerisable mixtures containing (A) one or more cationically polymerisable compounds, (B) a catalytic amount of an aromatic iodonium salt of the formula I $$[(Ar^1)(Ar^2)I]^+ [MX_n]^- \quad (I)$$

in which $Ar^1$ and $Ar^2$ independently of one another are phenyl, naphthyl or phenyl which is substituted by one or more of the radicals $C_1$–$C_8$-alkyl, phenyl, halogen, nitro or $C_1$–$C_4$-alkoxy, or $Ar^1$ and $Ar^2$ together are a divalent radical of the formula II

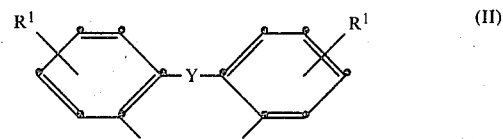

in which Y is a direct bond, —O—, —S— or —CH$_2$— and $R^1$ is $C_1$–$C_4$-alkyl, halogen, nitro or $C_1$–$C_4$-alkoxy, M is a metal atom or metalloid atom from the series comprising B, P, As, Sb, Sn, Bi and Fe, X is fluorine or chlorine and n is 4, 5 or 6 and 1 larger than the valency of M, (C) a catalytic amount of a compound of the formula III

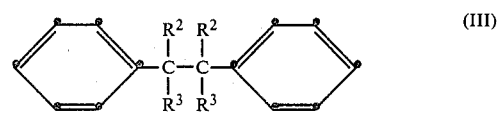

in which $R^2$ is $C_1$–$C_4$-alkoxy, —OCOR$^4$ or —O-Si($R^5$)($R^6$)($R^7$) and $R^4$ is $C_1$–$C_8$-alkyl or phenyl and $R^5$, $R^6$ and $R^7$ independently of one another are $C_1$–$C_4$-alkyl or phenyl and $R^3$ is phenyl or $C_1$–$C_4$-alkyl, or of a compound of the formula IV

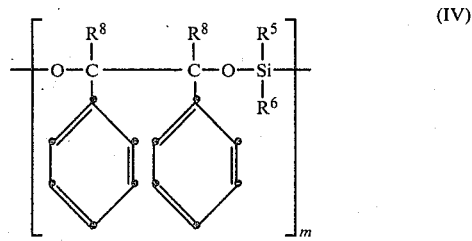

in which $R^8$ is phenyl, cyclohexyl or $C_1$–$C_4$-alkyl and m is 2 to 20, and (D), if desired, other additives.

The invention also relates to a process for the polymerisation of one or more cationically polymerisable compounds by heating in the presence of a catalytic amount of a compound of the formula I, defined above, and of a catalytic amount of a compound of the formula III or IV, defined above.

Compounds polymerisable according to the invention are O- or S-containing saturated heterocyclic compounds, in particular those having 3, 4 or 5 ring members, and their derivatives. Examples are oxiranes, such as ethylene oxide, propylene oxide, epichlorohydrin, styrene oxide, phenyl glycidyl ether or butyl glycidyl ether; oxetanes, such as trimethylene oxide, 3,3-dimethyloxetane or 3,3-di-(chloromethyl)-oxetane; oxolanes, such as tetrahydrofuran or 2,3-dimethyltetrahydrofuran; cyclic acetals, such as trioxan, 1,3-dioxolane or 1,3,6-trioxacyclooctane; cyclic lactones, such as β-propiolactone, ε-caprolactone and the alkyl derivatives thereof; thiiranes, such as ethylene sulfide, 1,2-propylene sulfide or thioepichlorohydrin; and thietanes, such as 1,3-propylene sulfide or 3,3-dimethylthietane.

Further compounds polymerisable according to the invention are those ethylenically unsaturated compounds which are polymerisable by a cationic mechanism. Such compounds include mono- and di-olefins, for example isobutylene, 1-octene, butadiene and isoprene; styrene, allylbenzene or vinylcyclohexane; vinyl ethers, such as vinyl methyl ether, vinyl isobutyl ether or ethylene glycol divinyl ether; vinyl esters, such as vinyl acetate or vinyl stearate; N-vinyl compounds, such as N-vinylpyrrolidone or N-vinylcarbazole, and dihydropyran derivatives, for example the 3,4-dihydro-2H-pyran-2-carboxylic acid esters of 2-hydroxymethyl-3,4-dihydro-2H-pyran.

Further compounds polymerisable according to the invention are the prepolymers of phenol-formaldehyde resins, urea-formaldehyde resin or melamine-formaldehyde resins, N-methylol derivatives of polycarboxylic acid amides, for example of polyacrylamide, and similar aminoplasts, and also mixtures of such aminoplasts with acrylic resins, alkyd resins or polyester resins containing functional groups.

Further compounds polymerisable according to the invention are mixtures of cationically polymerisable compounds and compounds polymerisable by free radicals, for example mixtures of epoxide resins with monomeric or oligomeric (meth)acrylic acid esters. In this case, the polymerisation takes place by a cationic mechanism and a free radical mechanism.

Compounds of particular importance amongst these polymerisable compounds which have been listed are di- and poly-epoxides and epoxide resin prepolymers, such as are used for the preparation of epoxide resins. This is usually effected by chemical curing with amines, phenols, dicarboxylic acid anhydrides and the like, either at room temperature or with heating. If the catalyst combination according to the invention is used, the epoxides can be thermally cured, without the addition of chemical reactants, i.e. a one-component system can be used.

The di- and poly-epoxides used for this purpose can be aliphatic, cycloaliphatic or aromatic compounds. Examples are the glycidyl ethers of aliphatic or cycloaliphatic diols or polyols, for example those of ethylene glycol, propane-1,2-diol, propane-1,3-diol, butane-1,4-diol, diethylene glycol, glycerol, trimethylolpropane or 1,4-dimethylol-cyclohexane or of 2,2-bis-(4-hydroxycyclohexyl)-propane, and the glycidyl ethers of di- and poly-phenols, for example of resorcinol, 4,4'-dihydroxydiphenylmethane, 4,4'-dihydroxydiphenyl-2,2-propane or novolacs. Further examples are the N-glycidyl compounds, for example the diglycidyl compounds of ethyleneurea, 1,3-propyleneurea or 5-dimethylhydantoin or of 4,4'-methylene-5,5'-tetramethyldihydantoin, or such as triglycidyl isocyanurate.

Further glycidyl compounds of industrial importance are the glycidyl esters of carboxylic acids, in particular of di- and poly-carboxylic acids. Examples are the glycidyl esters of adipic acid, phthalic acid, tetra- or hexahydrophthalic acid, isophthalic acid or terephthalic acid or of trimellitic acid.

Examples of polyepoxides, which are not glycidyl compounds, are the diepoxides of vinylcyclohexene or dicyclopentadiene, glycidyl 3,4-epoxycyclohexanecarboxylate or 3',4'-epoxycyclohexylmethyl 3,4-epoxycyclohexanecarboxylate, butadiene diepoxide or isoprene diepoxide, epoxidised linoleic acid derivatives or epoxidised polybutadiene.

Furthermore, it is also possible to use ethylenically unsaturated epoxide compounds which are able to react polyfunctionally under the conditions according to the invention and thus are capable of forming crosslinked resins. Examples of such compounds are allyl glycidyl ether, acrylic acid glycidyl ether or methacrylic acid glycidyl ether or unsaturated polyepoxides such as partially (meth)acrylated epoxide resins.

Preferred epoxides which can be used according to the invention are the di- and poly-glycidyl ethers of di- and poly-phenols.

The di- and poly-epoxides can be used in mixtures with one another or with monoepoxides or in mixtures with hydroxy compounds, for example in order to modify the physical properties of the resins obtainable therefrom. The di- and poly-epoxides can also be pre-cured by chemical means, for example by reaction with diols, amines or dicarboxylic acid anhydrides. The use of such prepolymers for the production of articles from epoxide resins can have certain advantages over the use of the di- and poly-epoxides, for example more simple storage and handling, more rapid processing to shaped articles and also the possibility for the incorporation of additives, such as glass fibres or pigments, into the prepolymers, for example during the preparation of prepregs.

Such prepolymers can also be prepared by photochemical means, since on irradiation with UV light the iodonium salts of the formula I decompose, with the formation of $MX_{n-1}$, which act as initiators for the cationic polymerisation. Irradiation of this type can also be carried out in the presence of photosensitisers. Finally, the prepolymers can also be prepared by the process according to the invention. In this case, thus, the di- or poly-epoxide is first pre-cured at a relatively low temperature level and the resulting prepolymer is thoroughly cured at a higher temperature level.

The aromatic iodonium salts of the formulae I and II used according to the invention are known compounds which can be prepared, for example, by the methods indicated by F. M. Beringer et al. in J. Amer. Chem. Soc. 75, 2705 (1953) or loc. cit. 81, 342 (1959), or by the method indicated in German Offenlegungsschrift No. 2,618,871.

Preferred compounds are those of the formula I in which $Ar^1$ and $Ar^2$ are tolyl, methoxyphenyl, phenoxyphenyl, nitrophenyl or chlorophenyl, but in particular phenyl, and in which the anion $[MX_n]^-$ is one of the anions $BF_4^-$, $PF_6^-$, $AsF_6^-$ or $SbF_6^-$.

Examples of individual compounds of the formula I are: diphenyliodonium tetrafluoborate, di-(p-tolyl)-iodonium pentafluorostannate, di-(4-nitrophenyl)-iodonium hexafluorophosphate, di-(4-phenoxyphenyl)-iodonium hexafluorophosphate, di-(4-tert.-butylphenyl)-iodonium hexafluorostibiate, di-2-naphthyl-iodonium tetrafluoborate, diphenyliodonium hexafluorophosphate, di-(4-diphenylyl)iodonium hexafluoroarsenate, di-(3-methoxyphenyl)iodonium hexachlorostibiate, phenyl-naphthyl-iodonium tetrafluoborate, phenyl-4-fluorophenyl-iodonium hexafluorophosphate, phenyl-(2-chloro-4-nitrophenyl)iodonium hexachlorostibiate, phenyl-(3,5-diisopropylphenyl)- iodonium tetrafluoborate, diphenyl-2,2'-diyliodonium hexafluorophosphate, diphenylmethane-2,2'-diyliodonium hexafluoroarsenate, (diphenyl oxide)-2,2'-diyliodonium hexafluorostibiate, [di-(4-tolyl) sulfide]-2,2'-diyl-iodonium tetrafluoborate, di-(4-nitrophenyl)methane-2,2'-diyl-iodonium pentafluorostannate, [di-(4-chlorophenyl)oxide]-2,2'-diyl-iodonium tetrafluoborate and 4,4'-dimethoxydiphenyl-2,2'-diyl-iodonium hexafluorophosphate.

With the exclusion of UV light, the compounds of the formula I are stable compounds at room temperature. They are still relatively stable even when hot, so that they cannot be used on their own as thermal initiators for cationic polymerisation reactions. Only the addition of agents which form free radicals on heating, such as the compounds of the formula III or IV, renders the iodonium salts heat-sensitive, so that they can be used as thermal polymerisation initiators.

The compounds of the formula III are derivatives of dibenzyl which decompose into radicals on heating. They are known compounds which can be prepared, for example, from benzpinacol or acetophenone-pinacol by etherification, esterification or silylation by generally customary methods. Some of the compounds of the formula III can also be prepared by oxidative dimerisation of the corresponding benzyl compounds

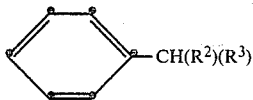

In formula III, $R^2$ can be alkoxy, for example methoxy, ethoxy, isopropoxy or tert.-butoxy. $R^2$ can also be an acyloxy radical —$OCOR^4$, for example acetoxy, propionyloxy, butyroyloxy, 2-ethylbutyroyloxy, capryloyloxy or benzoyloxy. Preferably, $R^2$ is $C_1$–$C_4$-alkoxy or —$OSi(CH_3)_3$. The radical $R^3$ is preferably phenyl.

Examples of compounds of the formula III are: benzpinacol dimethyl ether, benzpinacol diethyl ether, benzpinacol diisopropyl ether, benzpinacol diacetate, benzpinacol dipropionate, benzpinacol dibutyrate, benzpinacol dicaprylate or benzpinacol dibenzoate, 1,2-di(-trimethylsiloxy)-tetraphenylethane, acetophenonepinacol dimethyl ether, acetophenonepinacol dipropyl ether, acetophenonepinacol diacetate, acetophenonepinacol divalerate or acetophenonepinacol dibenzoate, propiophenone-pinacol dimethyl ether, propiophenone pinacol dibutyl ether, propiophenone-pinacol diacetate, 2,3-diphenyl-2,3-bis(triphenylsiloxy)-butane or 3,4-diphenyl-3,4-bis-(trimethylsiloxy)-hexane.

The compounds of the formula IV are oligomeric silyl ethers of pinacols with a molecular weight of about 500–5,000. They can be prepared in accordance with German Offenlegungsschrift No. 2,632,294 from the corresponding aryl ketone by reaction with dialkyl- or diarylchlorosilanes in the presence of metals such as Mg, Li, Na or K. Examples of compounds of the formula IV are the reaction products of benzophenone, propiophenone or acetophenone with dichlorodimethylsilane or dichlorodiphenylsilane in the presence of magnesium. Preferred compounds of the formula IV are those in which $R^8$ is phenyl and $R^5$ and $R^6$ are methyl.

The compounds of the formulae III and IV are compounds which are stable at room temperature and decompose into radicals on heating. If this is effected in the presence of aromatic iodonium salts of the formula I, this results in the formation of initiators for cationic polymerisations; the precise structure of these initiators is not reliably known. The compounds of the formulae III and IV on their own are not able-even at elevated temperature-to initiate cationic polymerisation reactions. However, by means of the mixture, according to the invention, of aromatic iodonium salts with an agent which forms free radicals on heating it is possible to cause cationically polymerisable compounds to undergo complete polymerisation within a short time by simple heating.

For carrying out the polymerisation in practice, the monomer or monomer mixture is mixed with the necessary amount of the two catalysts. These mixtures are stable at room temperature and can be handled without hazard. In general, it is not necessary to add any additional activating component prior to initiation of polymerisation, and the mixtures are therefore onecomponent systems which can be cured at any time. The polymerisation itself is effected by heating the mixture to elevated temperature. In general, temperatures of 60°–200° C. and in particular of 100°–160° C. are necessary for this purpose, depending on the material used and the polymerisation time desired. The shorter the desired polymerisation time, the higher must be the polymerisation temperature. Usually, polymerisation will be carried out with simultaneous shaping, and thus, for example, in hot presses or in moulds which can be supplied with a source of heat. Heating can be effected, for example, in an oven, by infrared radiation or microwave radiation.

As already mentioned above, the thermally-initiated polymerisation can also be combined with a photopolymerisation. In this case, the monomer is either first subjected to irradiation with short-wave light and then heated or first heated and then irradiated. The conventional UV lamps are suitable for the irradiation, and the effect of the irradiation can be further increased by the addition of catalytic amounts of a photosensitiser. Suitable photosensitisers are, for example, organic dyes, fused aromatic hydrocarbons, for example perylene, anthracene or thioxanthone and derivatives thereof, such as are known in general as sensitisers for photochemical processes. The advantage of such additional UV radiation is that, by this means, the time for heat-curing can be shortened or the curing temperature can be lowered.

The amount of the two catalysts which is required depends on the nature of the material to be polymerised and on the desired polymerisation conditions. In general, 0.1 to 5% by weight of each of the two catalysts is used, based on the weight of the compound to be polymerised. Preferably, 0.5–2% of the aromatic iodonium salt and 1–5% of the agent which forms free radicals on heating are used.

In addition to the polymerisable compounds and the catalysts, the mixture can also contain yet further additives, such as are customary in the technology of plastics and resins. Examples of such additives are extender resins, fillers, pigments, dyes, glass fibres or other fibres, stabilisers, such as antioxidants or light stabilisers, flameproofing agents, antistatic agents, blowing agents or levelling assistants. Further examples of additives are heat stabilisers, which increase the storage stability of the mixtures, for example specific nitriles, amides or sulfoxides.

These additives can be mixed into the polymerisable compounds at the same time as the catalysts, or also independently of the latter either beforehand or afterwards. Depending on their consistency, the mixtures according to the invention are solids or liquids or highly viscous liquids. For use as paints, a spreadable or sprayable consistency will be preferred. For use as a casting or laminating resin, a castable consistency will be preferred. For use as a compression moulding composition, a solid consistency will be preferred.

The use of the cured compositions according to the invention is the same as that of the compositions cured by conventional means. Examples are surface protection, adhesives, electrical insulating compositions and the production of laminates and mouldings or of foamed articles. The choice of polymerisable compound depends on the intended use. In certain cases mixtures of cationically curable compounds will be used in order to achieve specific properties in the cured resin. These can be mixtures of compounds of the same chemical type, for example two different polyepoxides or one polyepoxide and a monoepoxide, or mixtures of compounds of different types, for example a mixture of a polyepoxide and tetrahydrofuran or caprolactone or a mixture of a monoepoxide and a dicarboxylic acid anhydride.

Further details can be seen from the examples which follow. In these examples, parts and percentages are by weight.

EXAMPLE 1

5 g of Araldit GY 250 (highly viscous epoxide resin which is based on bisphenol A glycidyl ether and has an epoxy equivalent of 182–194 g/equivalent, Ciba-Geigy, Basel) and the amount of catalysts which is indicated in Tables 1 and 2 are filled into a test tube and homogenised by stirring with gentle warming (about 40° C.). Whilst stirring continuously with a glass rod, the test tube is warmed to 160° C.±2° C. in an oil bath until the glass rod can no longer be moved because of the gelling which has taken place. This time is designated the gel time. The tables which follow show the effect of various catalysts and co-catalysts, on their own or in a mixture according to the invention.

TABLE 1

| Catalyst | Co-catalyst | Gel time |
| --- | --- | --- |
| 2% of diphenyliodonium hexafluoroarsenate | — | >20 minutes |
| — | 2% of oligomer A* | >20 minutes |
| — | 2% of benzpinacol bis-(tetramethyl-silyl ether) | >20 minutes |
| — | 2% of benzpinacol dimethyl ether | >20 minutes |
| 2% of diphenyliodonium hexafluoroarsenate | 2% of oligomer A* | 1 minute |
| 2% of diphenyliodonium hexafluoroarsenate | 2% of benzpinacol bis-(trimethyl-silyl ether) | 45 seconds |
| 2% of diphenyliodonium hexafluoroarsenate | 2% of benzpinacol dimethyl ether | 45 seconds |

*Oligomer A: product of the formula IV, in which $R^5$ and $R^6$ are methyl and $R^8$ is phenyl, prepared by reacting benzophenone with dimethyldichlorosilane by the process of German Offenlegungsschrift 2,632,294.

TABLE 2

| Catalyst | Co-catalyst | Gel time |
| --- | --- | --- |
| 2% of diphenyliodonium tetrafluoborate | — | >20 minutes |
| 2% of diphenyliodonium hexafluorophosphate | — | >20 minutes |

TABLE 2-continued

| Catalyst | Co-catalyst | Gel time |
| --- | --- | --- |
| 2% of diphenyliodonium hexafluoroarsenate | — | >20 minutes |
| 2% of diphenyliodonium tetrafluoborate | 2% of oligomer A | 5 minutes |
| 2% of diphenyliodonium hexafluorophosphate | 2% of oligomer A | 2 minutes |
| 2% of diphenyliodonium hexafluoroarsenate | 2% of oligomer A | 1 minute |

EXAMPLE 2

5 g of Araldit CY 179 (epoxide resin of low viscosity which is based on epoxidised cycloolefins and has an epoxy equivalent of 7.0–7.5 epoxide equivalents/kg, Ciba-Geigy, Basel) and the amount of catalyst indicated in Table 3 are filled into a test tube and warmed, as in Example 1, at 160° C. until gelling takes place.

TABLE 3

| Catalyst | Co-catalyst | Gel time |
| --- | --- | --- |
| 2% of diphenyliodonium hexafluorophosphate | — | >20 minutes |
| 2% of diphenyliodonium hexafluorophosphate | 2% of oligomer A | 85 seconds |
| 2% of diphenyliodonium hexafluorophosphate | 2% of benzpinacol bis-(trimethyl-silyl ether) | 50 seconds |

EXAMPLE 3

A 1.0 mm thick rubber ring is placed as a spacer between 2 glass plates. The inside of the ring is filled with the liquid resin mixture. The sample is irradiated, in a PPG irradiation apparatus with 2 lamps each with a power of 80 watt/cm, in 2 passes in each case, from above and below, at a transport speed of 10 m/minute. This corresponds to an exposure time of about 17 seconds. The samples are then heated at 140° C. in a oven for 3 minutes. The Barcol hardness of the cured resin is then measured.

The resin used is a liquid epoxide resin which is based on bisphenol A glycidyl ether and has an epoxide equivalent of 182–194 g/equivalent (Araldit GY 250 from Ciba-Geigy AG, Basel), to which the amounts of catalysts indicated in Table 4 are mixed.

TABLE 4

| Catalysts | Barcol hardness |
| --- | --- |
| First irradiation, then heating | |
| 1% of diphenyliodonium hexafluorophosphate 1% of oligomer A 0.1% of 2-isopropylthioxanthone | 57 |
| 1% of diphenyliodonium hexafluorophosphate 1% of oligomer A 0.01% of 2-isopropylthioxanthone | 38 |

Similar results are obtained when perylene is used in place of isopropylthioxanthone as the photosensitiser.

Without the addition of a photosensitiser, the exposure time must be considerably prolonged in order to obtain the same results.

The same experiments were also carried out in reverse sequence, that is to say the sample is first heated at 140° C. for 3 minutes and is then irradiated for 17 seconds. The results are listed in Table 5.

TABLE 5

| Catalysts | Barcol hardness |
|---|---|
| 1% of diphenyliodonium hexafluorophosphate<br>1% of oligomer A<br>0.1% of 2-isopropylthioxanthone | 58 |
| 1% of diphenyliodonium hexafluorophosphate<br>1% of oligomer A<br>0.01% of 2-isopropylthioxanthone | 20 |

What is claimed is:

1. A thermally polymerisable mixture containing
(A) one or more cationically polymerisable compounds,
(B) a catalytic amount of an aromatic iodonium salt of the formula I $$[(Ar^1)(Ar^2)I]^+ [MX_n]^- \quad (I)$$

in which $Ar^1$ and $Ar^2$ independently of one another are phenyl, naphthyl or phenyl which is substituted by one or more of the radicals $C_1$-$C_8$-alkyl, phenyl, phenoxy, halogen, nitro or $C_1$-$C_4$-alkoxy, or $Ar^1$ and $Ar^2$ together are a divalent radical of the formula II

in which Y is a direct bond, —O—, —S—, or —CH$_2$— and $R^1$ is $C_1$-$C_4$-alkyl, halogen, nitro or $C_1$-$C_4$-alkoxy, M is a metal atom or metalloid atom from the series comprising B, P, As, Sb, Sn, Bi and Fe, X is fluorine or chlorine and n is 4, 5 or 6 and 1 larger than the valency of M, and (C) a catalytic amount of a compound of the formula III

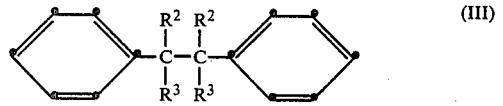

in which $R^2$ is $C_1$-$C_4$-alkoxy, —OCOR$^4$ or —O-Si(R$^5$)(R$^6$)(R$^7$) and $R^4$ is $C_1$-$C_8$-alkyl or phenyl and $R^5$, $R^6$ and $R^7$ independently of one another are $C_1$-$C_4$-alkyl or phenyl and $R^3$ is phenyl or $C_1$-$C_4$-alkyl, or of a compound of the formula IV

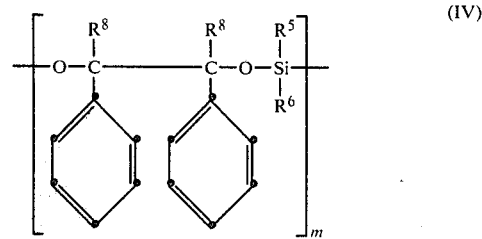

in which $R^8$ is phenyl, cyclohexyl or $C_1$-$C_4$-alkyl and m is 2 to 20.

2. A polymerisable mixture according to claim 1, wherein component (A) is a di- or poly-epoxide or an epoxide resin prepolymer or a mixture of several such epoxide compounds.

3. A mixture according to claim 1, wherein component (A) is a di- or poly-glycidyl ether of a di- or poly-phenol, or a mixture of several such glycidyl ethers with one another or with other epoxide compounds.

4. A mixture according to claim 1, wherein component (B) is a compound of the formula I in which $Ar^1$ and $Ar^2$ independently of one another are phenyl, tolyl, methoxyphenyl, phenoxyphenyl, nitrophenyl or chlorophenyl.

5. A mixture according to claim 4, in which $Ar^1$ and $Ar^2$ are phenyl.

6. A mixture according to claim 1, wherein component (B) is a compound of the formula I in which the anion $[MX_n]^-$ is one of the anions $BF_4^-$, $PF_6^-$, $AsF_6^-$ or $SbF_6^-$.

7. A mixture according to claim 1, wherein component (C) is a compound of the formula III in which $R^2$ is $C_1$-$C_4$-alkoxy or —OSi(CH$_3$)$_3$ and $R^3$ is phenyl, or a compound of the formula IV in which $R^8$ is phenyl and $R^5$ and $R^6$ are methyl.

8. A process for the thermally-initiated polymerisation of cationically polymerisable compounds, using a catalyst and a co-catalyst, wherein the catalyst used is an aromatic iodonium salt of the formula I according to claim 1 and the co-catalyst used is a compound of the formula III or IV according to claim 1.

9. A process according to claim 8, wherein the cationically polymerisable compound used is a di- or polyepoxide or an epoxide resin prepolymer or a mixture of several such epoxide compounds.

10. A process according to claim 8, wherein the polymerisation is carried out in two stages by heating to different temperatures.

11. A process according to claim 8, wherein the polymerisable mixture is irradiated with short-wave light before or after heating.

12. A process according to claim 11, wherein catalytic amounts of a photosensitiser are added to the polymerisable mixtures.

13. A mixture according to claim 1, wherein component (A) is an aminoplast or a phenol-formaldehyde resin.

* * * * *